United States Patent
Nghiem et al.

(10) Patent No.: US 7,979,089 B2
(45) Date of Patent: **\*Jul. 12, 2011**

(54) WIRELESS DATA COMMUNICATION CARD WITH COMPACT ANTENNA

(75) Inventors: David Nghiem, Shoreview, MN (US); Paul T. Simonette, Maple Lake, MN (US); Randy Sazenski, Robbinsdale, MN (US); Matthew G. Jaenke, Fridley, MN (US); David H. Tran, Plymouth, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/779,082

(22) Filed: May 13, 2010

(65) Prior Publication Data

US 2010/0222105 A1  Sep. 2, 2010

Related U.S. Application Data

(63) Continuation of application No. 11/113,460, filed on Apr. 25, 2005, now Pat. No. 7,742,787.

(51) Int. Cl.
*H04B 1/38* (2006.01)
*H04M 1/00* (2006.01)

(52) U.S. Cl. ..... 455/558; 455/557; 455/129; 455/550.1; 379/433.09; 379/93.05; 343/829; 343/770; 343/767

(58) Field of Classification Search .......... 455/557, 455/558, 129, 90.3, 575, 74, 556, 550.1, 455/128, 347, 351; 379/433.01, 433.09, 379/93.05; 343/702, 767, 906, 833, 834, 343/829, 850, 895, 770, 795
See application file for complete search history.

(56) References Cited

U.S. PATENT DOCUMENTS

| | | | |
|---|---|---|---|
| 5,289,198 | A | 2/1994 | Altshuler |
| 6,278,864 | B1 | 8/2001 | Cummins et al. |
| 6,404,393 | B1 | 6/2002 | Nelson et al. |
| 6,594,506 | B1 | 7/2003 | Vapaakoski et al. |
| 7,023,909 | B1 | 4/2006 | Adams et al. |
| 2002/0101377 | A1 | 8/2002 | Crawford |
| 2002/0180647 | A1 | 12/2002 | Nysen |
| 2002/0180656 | A1 | 12/2002 | Pecora, Jr. et al. |
| 2004/0140938 | A1 | 7/2004 | Kadambi et al. |
| 2005/0030239 | A1 | 2/2005 | Annabi et al. |
| 2006/0044205 | A1 | 3/2006 | Lynch et al. |
| 2006/0074572 | A1 | 4/2006 | Bye et al. |
| 2006/0132364 | A1 | 6/2006 | Qi et al. |
| 2007/0152891 | A1 | 7/2007 | Fabrega-Sanchez et al. |

FOREIGN PATENT DOCUMENTS

| | | |
|---|---|---|
| EP | 0604338 A1 | 6/1994 |
| JP | 2001-102828 A | 4/2001 |

*Primary Examiner* — Sujatha Sharma
(74) *Attorney, Agent, or Firm* — Michael J. Ostrom; Stephen W. Bauer

(57) ABSTRACT

A wireless data communication card configured in accordance with an example embodiment of the invention includes a low profile antenna arrangement that does not protrude from the housing of the computing device when the wireless data communication card is inserted into the housing. The low profile design is achieved without compromising the radio frequency ("RF") characteristics and performance of the wireless data communication card by tuning the antenna arrangement to account for conductive ground structure located within the housing of the computing device. In accordance with one practical embodiment of the invention, the wireless data communication card is compliant with IEEE Standard 802.11(b) and compliant with PCMCIA specifications.

20 Claims, 7 Drawing Sheets

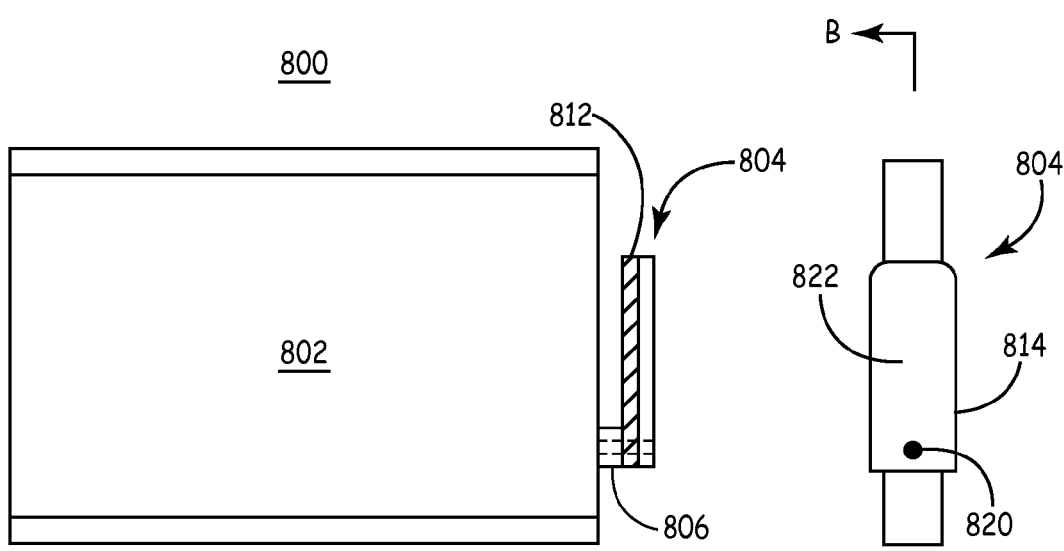
FIG. 8
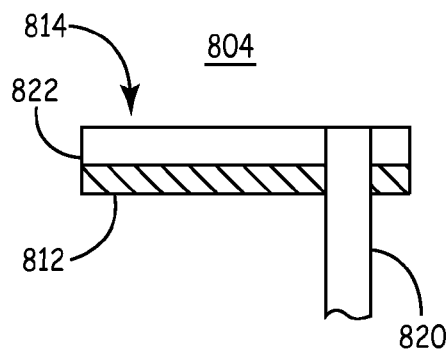
FIG. 9
FIG. 10

WIRELESS DATA COMMUNICATION CARD WITH COMPACT ANTENNA

This application is a continuation application of U.S. patent application Ser. No. 11/113,460, filed on Apr. 25, 2005 now U.S. Pat. No. 7,742,787, which is incorporated herein by reference in its entirety.

TECHNICAL FIELD

The present invention relates generally to an interface tool that facilitates wireless data communication between computing devices. More particularly, the present invention relates to a wireless data communication card for a computing device such as a personal computer or a remote telemetry component for implantable medical devices ("IMDs").

BACKGROUND

Computers and computing devices are becoming common appliances in homes, offices, medical facilities, schools, manufacturing plants, and elsewhere. Customized computing devices that are based upon conventional personal computer architectures are also being deployed to support specific applications, such as medical testing, remote data communication with IMDs, automotive diagnostics, and the like. Furthermore, wireless data communication with computing devices and computer networks is becoming increasingly common. Such wireless data communication requires data transmission in accordance with a specific data communication protocol, a wireless transceiver, and a suitable antenna structure configured to transmit and receive signals, typically via a radio frequency ("RF") data communication link.

In practical applications, an RF antenna is attached to a wireless network card that is inserted into the computing device. In many compact devices, e.g., notebook computers, the wireless data communication card is received into a slot or receptacle in the computing device, where the slot or receptacle is sized and configured in accordance with an accepted standard. For example, one standard format is defined by the Personal Computer Memory Card Interface Association ("PCMCIA"), and most portable computing devices have a PCMCIA slot that is configured to receive PCMCIA cards, including PCMCIA wireless networking cards. In conventional systems, the RF antennas for wireless cards remain outside of the computing device housing (even when the cards are fully inserted into the card slot) to avoid signal interference with the hardware and metal structures found within the housing of the computing device. This situation is depicted in FIG. 1, which shows a notebook computer 100 and a wireless data communication card 102 inserted into a slot 104 formed within notebook computer 100. While this arrangement may result in adequate RF performance, the protruding wireless data communication card 102 is susceptible to tampering, damage, and inadvertent dislodging.

Accordingly, it is desirable to have a compact, efficient, and effective RF antenna structure suitable for use with a wireless data communication card for a computing device (e.g., a personal computer, an IMD telemetry component, or the like). In addition, it is desirable to have a wireless data communication card having an integrated RF antenna that does not protrude from the computing device when the card is inserted into the computing device. Furthermore, other desirable features and characteristics of the present invention will become apparent from the subsequent detailed description and the appended claims, taken in conjunction with the accompanying drawings and the foregoing technical field and background.

BRIEF SUMMARY

A wireless data communication card configured in accordance with an embodiment of the invention utilizes a compact and low profile RF antenna structure. The low profile design of the RF antenna structure enables the wireless data communication card to be completely enclosed within the housing of a computing device. The RF antenna structure does not protrude from the computing device, and provides compact overall appearance. Furthermore, the wireless data communication card is protected by the housing of the computing device.

The above and other aspects of the invention may be carried out in one form by an antenna arrangement for a wireless data communication card configured for use with a computing device. The antenna arrangement includes an RF ground structure for establishing RF ground coupling to a conductive structure of the computing device, and at least one antenna element tuned in accordance with the conductive structure of the computing device.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 8 is a top view of a wireless data communication card configured in accordance with an embodiment of the invention;

FIG. 9 is an end view of the antenna arrangement for the wireless data communication card shown in FIG. 8;

FIG. 10 is a sectional view of the antenna arrangement shown in FIG. 9, as viewed along line B-B;

DETAILED DESCRIPTION

The following detailed description is merely illustrative and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. In addition, those skilled in the art will appreciate that the present invention may be practiced in conjunction with any number of data transmission protocols and that the devices described herein are merely practical example applications for the invention.

For the sake of brevity, conventional techniques related to wireless data communication, RF antenna design, computing device peripherals, computing device architectures, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 7:
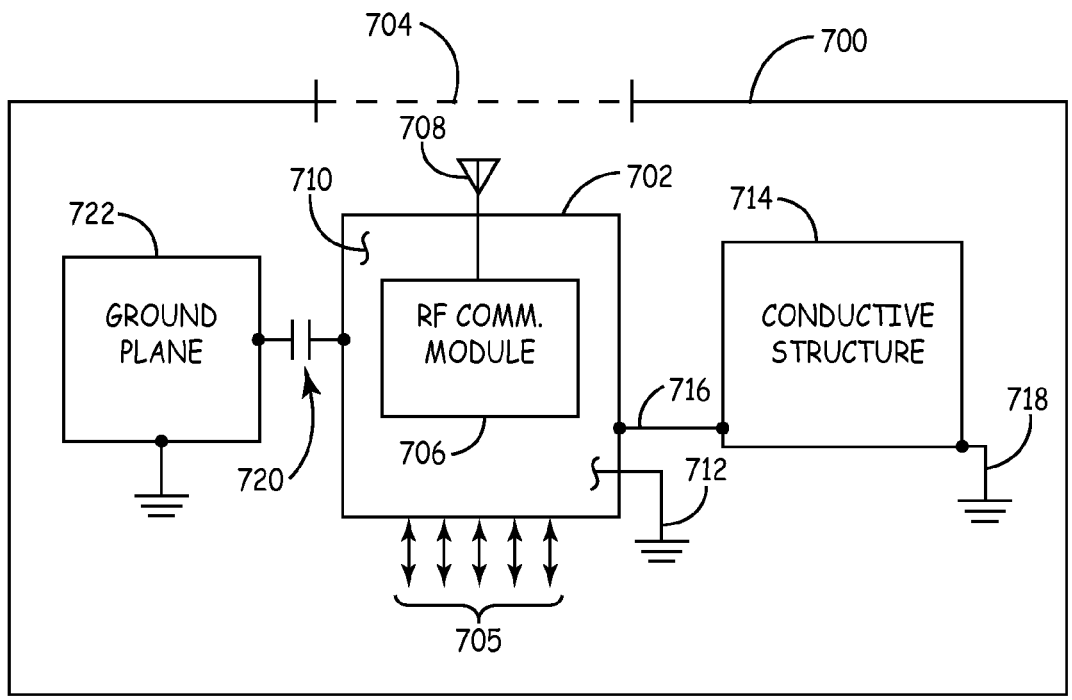
FIG. 7 is a schematic representation of a computing device and a wireless data communication card according to an embodiment of the invention.

The following description may refer to elements or features being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the schematic shown in FIG. 7 depicts one example arrangement of elements, additional intervening elements, devices, features, or components may be present in an actual embodiment (assuming that the functionality of the device is not adversely affected).

Figure 1:
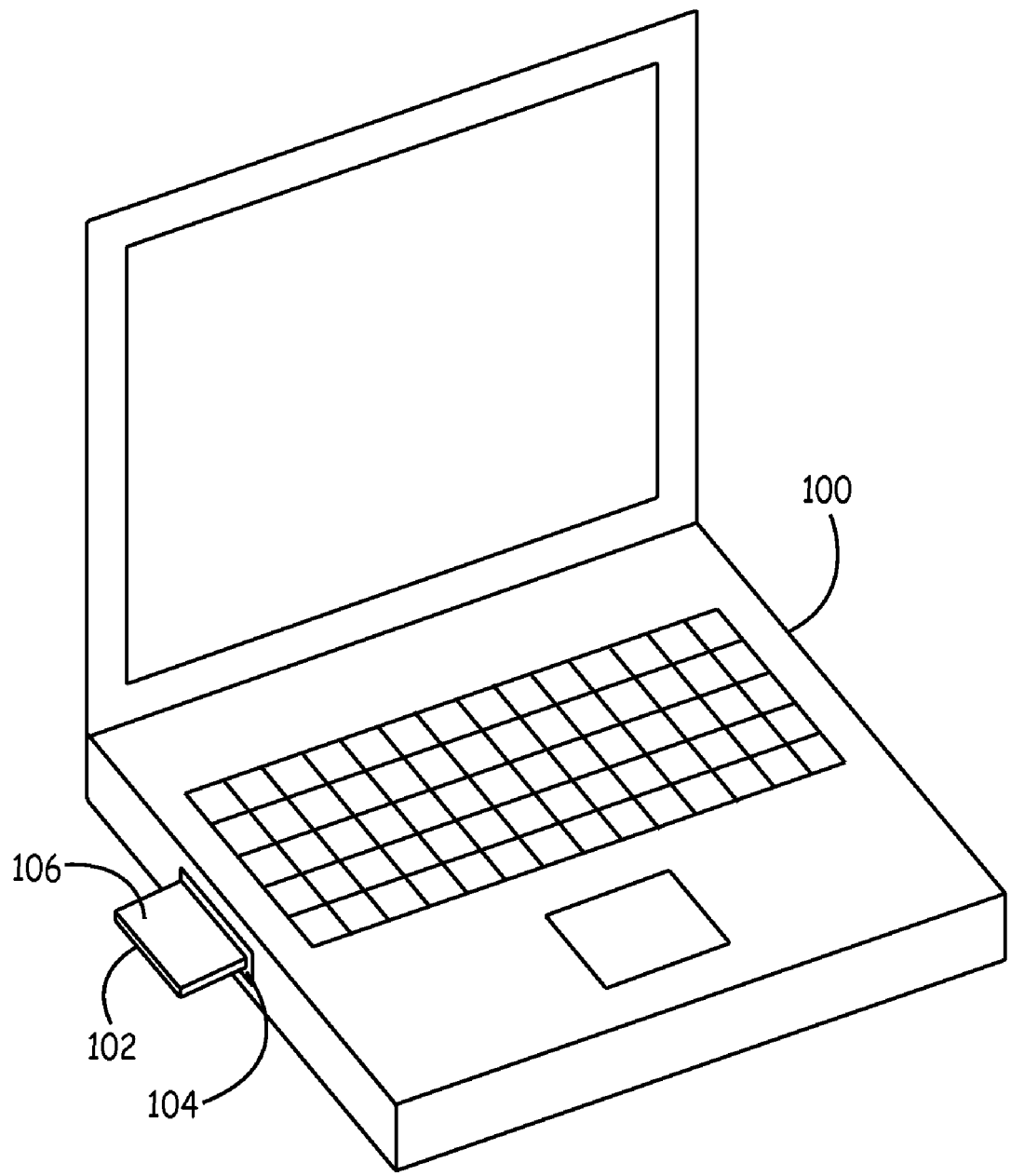
FIG. 1 is a perspective view of a computing device and a wireless data communication card according to the prior art.
Figure 2:
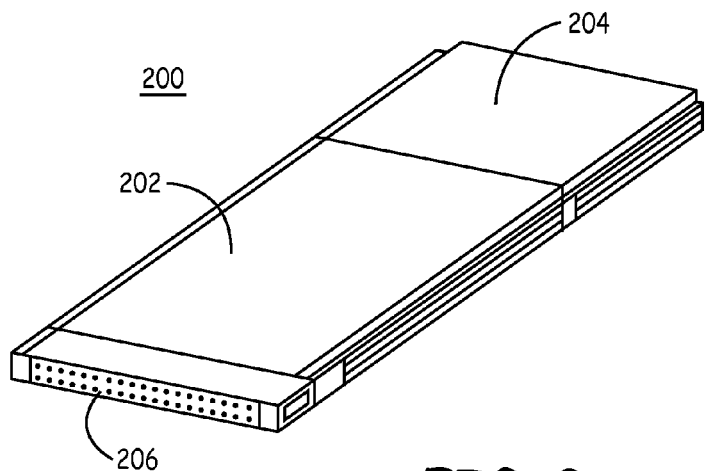
FIG. 2 is a perspective view of a wireless data communication card according to the prior art.

As mentioned above, the notebook computer 100 (or medical device programmer) shown in FIG. 1 cooperates with a conventional wireless network card 102 to establish an RF data communication link with another computing device or a wireless access device. Even though wireless network card 102 is inserted properly within notebook computer 100, a portion still protrudes from slot 104. In particular, an antenna portion 106 of wireless network card 102 protrudes from the housing of notebook computer 100. FIG. 2 is a perspective view of a prior art wireless data communication card 200 having a main portion 202 and an antenna portion 204. Main portion 202 may include electrical contacts, ports, or pins 206 for establishing electrical connections with the electronics within the cooperating computing device. Antenna portion 204 is connected to main portion 202 to enable antenna portion 204 to convey RF signals to and from RF circuitry contained in main portion 202. As mentioned above, antenna portion 204 protrudes from the housing of the computing device when wireless data communication card 200 is installed in the computing device.

Figure 3:
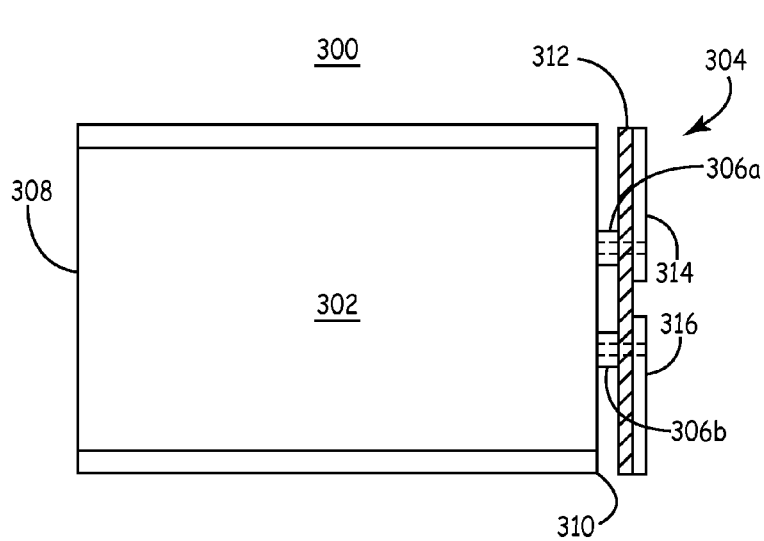
FIG. 3 is a top view of a wireless data communication card configured in accordance with an embodiment of the invention.
Figure 4:
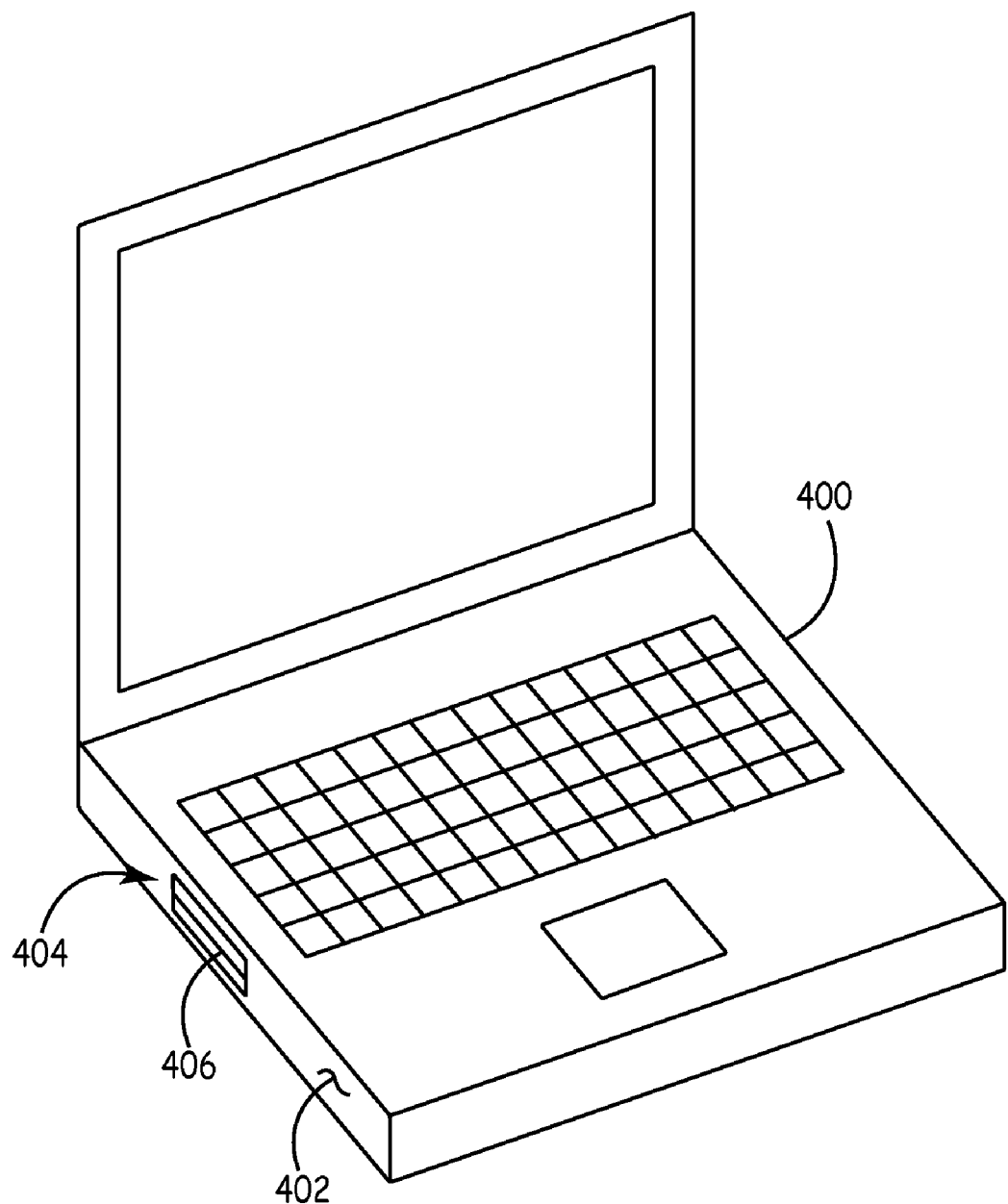
FIG. 4 is a perspective view of a computing device having the wireless data communication card shown in FIG. 3 inserted therein.

FIG. 3 is a top view of a wireless data communication card 300 configured in accordance with one practical embodiment of the invention. Wireless data communication card 300 is preferably configured in a low profile package such that, when installed into the cooperating computing device, wireless data communication card 300 is enclosed within the housing of the computing device. In this regard, FIG. 4 is a perspective view of a computing device 400 having wireless data communication card 300 inserted therein (in FIG. 4, wireless data communication card 300 is hidden from view). Computing device 400 generally includes a housing 402 and a card slot 404 formed in housing 402. In the practical embodiment, card slot 404 is shaped, sized, and otherwise configured to receive wireless data communication card 300. Thus, wireless data communication card 300 is configured for compatible engagement with card slot 404 and with appropriate internal components of computing device 400. In this regard, wireless data communication card 300 may include a main portion that is functionally equivalent to main portion 202 of conventional wireless data communication card 200 (see FIG. 2). For example, card slot 404 may be a PCMCIA slot sized to accommodate a PCMCIA-sized card. Card slot 404 may include or interact with a suitably configured cover, lid, door, or other enclosure mechanism 406 that encloses the wireless data communication card 300 within housing 402. Such an enclosure mechanism 406 may be desirable to further protect wireless data communication card 300 against physical damage and/or exposure to environmental factors including spillage and other incidence. Referring again to FIG. 3, wireless data communication card 300 generally includes a conductive outer housing 302, an RF communication module located within conductive outer housing 302, and an antenna arrangement 304. The RF communication module is hidden from view in FIG. 3. The RF communication module may include an RF transmitter and an RF receiver (which may be combined into an RF transceiver) configured to support wireless data communication via an RF link using techniques known to those skilled in the art. Indeed, the RF communication module may be of a conventional design as employed by existing wireless PCMCIA cards. Antenna arrangement 304 is suitably coupled to the RF communication module to facilitate RF signal transmission from the RF communication module and/or to facilitate RF signal reception by the RF communication module. Antenna arrangement 304 may be physically and/or electrically coupled to the RF communication module via suitable RF connectors 306. RF connectors 306 may be realized as press-fit connectors having a grounded exterior and a conductive internal element that is utilized as the RF signal feed. In practice, RF connectors 306 may be of a conventional design. In the example embodiment of the invention, at least a portion of antenna arrangement 304 is located external to conductive outer housing 302. In particular, the radiating elements (or element) of antenna arrangement 304 are preferably located outside of conductive outer housing 302. Thus, RF connectors 306 establish an RF path from the RF communication module to the antenna arrangement 304, while physically securing antenna arrangement 304 to conductive outer housing 302.

In the practical embodiment of the invention, conductive outer housing 302 provides an RF ground structure for wireless data communication card 300. Accordingly, conductive outer housing 302 may include or be formed from an electrically conductive material, such as, without limitation: copper, stainless steel, any suitable metal, or alloys thereof. Conductive outer housing 302 is suitably configured to establish RF ground coupling to one or more conductive structures of the computing device in which wireless data communication card 300 is deployed. For example, when properly installed in the computing device, the RF ground structure defined by conductive outer housing 302 may come into direct contact with conductive structure contained in the housing of the computing device. Alternatively (or additionally), when properly installed in the computing device, the RF ground structure defined by conductive outer housing 302 may be capacitively coupled to conductive structure, such as a ground plane, located within the housing of the computing device. In this regard, FIG. 7 (which is a schematic representation of a computing device and a wireless data communication card inserted into the computing device) schematically depicts the possible direct and indirect coupling of the outer housing of the wireless data communication card to conductive structures of the computing device.

Conductive outer housing 302 has an insertion end 308 and an antenna end 310 opposing insertion end 308. Insertion end 308 is inserted into the computing device to install wireless data communication card 300, while antenna arrangement 304 is located at antenna end 310. Generally, antenna arrangement 304 has a low profile, relative to antenna end 310, such that antenna arrangement 304 can be enclosed within the housing of the computing device when wireless data communication card 300 is engaged in card slot 404 (see FIG. 4). The low profile design of antenna structure 304 is illustrated in FIG. 3, where antenna structure 304 extends only a small amount beyond antenna end 310. In the practical embodiment of the invention, the compact design of antenna arrangement 304 is achieved while maintaining antenna efficiency and good RF performance by tuning antenna arrangement 304 to account for the conductive structure or structures of the respective computing device.

Figure 5:
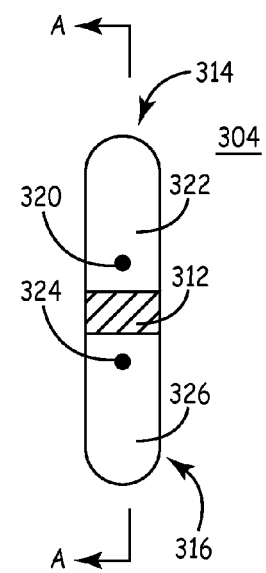
FIG. 5 is an end view of the antenna arrangement for the wireless data communication card shown in FIG. 3.
Figure 6:
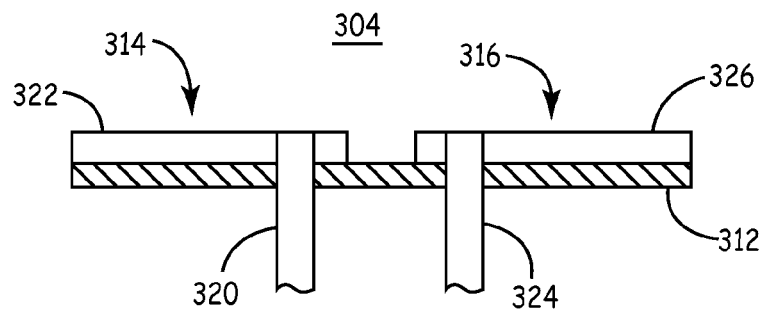
FIG. 6 is a sectional view of the antenna arrangement shown in FIG. 5, as viewed along line A-A.

FIG. 5 is an end view of antenna arrangement 304, and FIG. 6 is a sectional view of antenna arrangement 304 as viewed along line A-A in FIG. 5. It should be appreciated that antenna arrangement 304 is merely one suitable implementation and that alternate embodiments can be utilized with wireless data communication card 300. Antenna arrangement 304 generally includes a dielectric mounting element 312, a first antenna element 314, and a second antenna element 316. Alternate embodiments of antenna arrangement 304 may employ more or less than two antenna elements (for example, a single antenna embodiment is described below in connection with FIGS. 8-10).

First antenna element 314 may include an input section 320 and a radiating section 322, and second antenna element 316 may include an input section 324 and a radiating section 326. Regarding first antenna element 314, input section 320 protrudes from conductive outer housing 302 and is coupled to (or formed with) radiating section 322. In the practical embodiment, input section 320 may be coupled to (or formed with) RF connector 306a for coupling to the RF communication module in wireless data communication card 300. Regarding second antenna element 316, input section 324 also protrudes from conductive outer housing 302 and is coupled to (or formed with) radiating section 326. In the practical embodiment, input section 324 may be coupled to (or formed with) RF connector 306b for coupling to the RF communication module in wireless data communication card 300.

In this example, antenna arrangement 304 comprises a spatial diversity antenna architecture and wireless data communication card 300 is configured to select either first antenna element 314 or second antenna element 316 for operation with the RF communication module. This architecture enables wireless data communication card 300 to switch between antenna elements 314/316 as necessary to optimize RF performance. The diversity operation of antenna arrangement 304 may be accomplished by orienting radiating section 322 along antenna end 310 in one direction, while orienting radiating section 326 along antenna end 310 in the opposing direction. In other words, antenna elements 314/316 "point" in opposite directions. As shown in FIG. 6, antenna elements 314/316 may be generally located in the same plane, but oriented 180 degrees away from each other. In the example embodiment, radiating sections 322/326 are parallel and aligned with antenna end 310 of conductive outer housing 302.

In the example embodiment, input sections 320/324 may be formed from a solid conductor, e.g., a copper wire, and radiating sections 322/326 may be formed from a thin conductive material, e.g., a copper sheet, a metallic trace etched onto dielectric mounting element 312, a flexible conductor formed on a flexible adhesive tape, or the like. In an alternate embodiment of the invention, antenna elements 314/316 may comprise solid monopole wire antenna elements. In yet other embodiments of the invention, antenna arrangement 304 may leverage any suitable RF antenna technology, including, without limitation: microstrip; stripline; coaxial; twin lead; coplanar waveguide; and the like.

As mentioned above, antenna arrangement 304 is preferably tuned in accordance with conductive structure located at the respective computing device. In practice, such tuning may include, without limitation: tuning or adjusting the length of radiating sections 322/326; tuning or adjusting the length of input sections 320/324; providing RF matching elements; tuning or adjusting the relative orientations of antenna elements 314/316; tuning or adjusting the shape, size, or topology of antenna elements 314/316; tuning or adjusting the mounting distance of radiating sections 322/326 relative to antenna end 310; selecting the composition or material for antenna elements 314/316; selecting the composition or material for dielectric mounting element 312; tuning or adjusting the size, shape, or topology of dielectric mounting element 312; selecting the configuration of RF connectors 306; and/or selecting the manner in which antenna arrangement 304 is manufactured. In a practical embodiment of the invention, antenna arrangement 304 is tuned or otherwise configured to consider the intended deployment of wireless data communication card 300. For example, wireless data communication card 300 (including the RF communication module and antenna arrangement 304) may be suitably configured for operation in compliance with one or more wireless data communication protocols, such as IEEE Standard 802.11(b) or any variant of IEEE Standard 802.11. Furthermore, wireless data communication card 300 may be suitably configured in compliance with PCMCIA packaging and/or operating standards. Consequently, antenna arrangement 304 may also be suitably tuned to account for these and other practical requirements.

In contrast to prior art wireless network cards, antenna arrangement 304 can be custom tuned to enhance the RF performance of wireless data communication card 300 when it is installed in the computing device. In accordance with one practical deployment of the invention, wireless data communication card 300 is configured to cooperate with an IMD telemetry component that includes conductive structure therein. The internal structure of the IMD telemetry component does not vary significantly from one build to another and, therefore, each individual antenna arrangement 304 need not be custom tuned for each deployment. Rather, antenna arrangement 304 may be tuned in accordance with the nominal design of the IMD telemetry component, including the conductive structure found therein, and the tuned design for antenna arrangement 304 can be leveraged for any number of production units. Of course, differently tuned antenna arrangements 304 may be required for optimized RF performance in different computing device configurations made by different manufacturers.

In practice, the conductive structure of the computing device may be modeled, simulated, or otherwise measured to determine its impact on the RF characteristics of wireless data communication card 300. It should be appreciated that a number of conventional RF modeling, testing, or simulation applications may be utilized to assist in the tuning of antenna arrangement 304. Assuming that the conductive structure of the computing device remains fixed, antenna arrangement 304 can be suitably tuned after the conductive structure has been appropriately characterized. In connection with tuning, any number of RF tests or measurements of antenna arrangement 304 may be performed, including, without limitation: antenna efficiency; radiation pattern; and/or return loss. Such practical measurements can be analyzed to iteratively tune antenna arrangement 304 if necessary until the desired RF performance characteristics are achieved.

FIG. 7 is a schematic representation of a computing device 700 and a wireless data communication card 702 according to an embodiment of the invention. FIG. 7 depicts the situation where wireless data communication card 702 has engaged with card slot 704 and is installed in (and enclosed within) computing device 700. The arrows represent input and/or output connections 705 established between wireless data communication card 702 and computing device 700. As described above, wireless data communication card 702 includes an RF communication module 706 and an antenna arrangement 708 coupled to RF communication module 706. RF communication module 706 is housed within a conductive outer housing 710 of wireless data communication card 702. Notably, antenna arrangement 708 does not protrude from card slot 704, and is enclosed within computing device 700.

FIG. 7 schematically depicts that conductive outer housing 710 represents RF ground potential for antenna structure 708. This ground potential is identified by reference number 712 in FIG. 7. As described in more detail above, conductive outer housing 710 may be in direct contact with conductive structure 714 located within computing device 700. The direct connection is identified by reference number 716. Direct connection 716 may represent a mechanical coupling, a snap-fit, a press-fit, or other connection between wireless data communication card 702 and conductive structure 714. Conductive structure 714 may represent an RF or circuit ground potential 718, which thereby establishes RF ground coupling between conductive outer housing 710 and conductive structure 714.

FIG. 7 also schematically depicts capacitive coupling 720 between conductive outer housing 710 and a ground plane 722 (or other conductive structure) located within computing device 700. Capacitive coupling 720 may be utilized in addition to, or as an alternative to, direct connection 716 to establish RF ground coupling between conductive outer housing 710 and ground plane 722. In a practical embodiment, capacitive coupling 720 is achieved by a small separation (air gap) between components. Those skilled in the art should recognize that other methodologies for establishing an RF ground with conductive components within computing device 700 can be employed by a practical implementation of the invention, and that the techniques described in connection with FIG. 7 are not exhaustive.

FIG. 8 is a top view of a wireless data communication card 800 configured in accordance with an alternate embodiment of the invention, FIG. 9 is an end view of the antenna arrangement for wireless data communication card 800, and FIG. 10 is a sectional view of the antenna arrangement shown in FIG. 9, as viewed along line B-B. Wireless data communication card 800 may share several features and elements with wireless data communication card 300, and such shared features and elements will not be redundantly described herein.

Wireless data communication card 800 generally includes a conductive outer housing 802, an RF communication module located within conductive outer housing 802, and an antenna arrangement 804 coupled to the RF communication module. The RF communication module is hidden from view in FIG. 8. Antenna arrangement 804 may be physically and/or electrically coupled to the RF communication module via a suitable RF connector 806. RF connector 806 may be realized as a press-fit connector having a grounded exterior and a conductive internal element that is utilized as the RF signal feed. Generally, antenna arrangement 804 is similar to one of the two antenna components of antenna arrangement 304 described above. Although not a requirement of the invention, the example embodiment shown in FIG. 8 includes only one single antenna element rather than two or more antenna elements.

As described above in connection with the dual antenna embodiment, antenna arrangement 804 has a low profile such that antenna arrangement 804 can be enclosed within the housing of the computing device when wireless data communication card 800 is inserted into card slot 404 (see FIG. 4). In the practical embodiment of the invention, the compact design of antenna arrangement 804 is achieved while maintaining antenna efficiency and good RF performance by tuning antenna arrangement 804 to account for the conductive structure or structures of the respective computing device.

Referring to FIGS. 9 and 10, antenna arrangement 804 generally includes a dielectric mounting element 812 and an antenna element 814. Antenna element 814 may include an input section 820 and a radiating section 822. Input section 820 protrudes from conductive outer housing 802 and is coupled to (or formed with) radiating section 822. In the practical embodiment, input section 820 may be coupled to (or formed with) RF connector 806 for coupling to the RF communication module in wireless data communication card 800. In this example, antenna arrangement 804 comprises a single "inverted L" shaped antenna architecture that provides a relatively uniform radiation pattern that extends away from the host-computing device. The orientation of radiating section 822 may be selected to suit the needs and packaging requirements of the particular application. For example, the orientation of antenna arrangement 804 may be selected to accommodate the location of an RF feed point on conductive outer housing 802. In the example embodiment, radiating section 822 is parallel and aligned with the end of conductive outer housing 802.

As mentioned above, antenna arrangement 804 is preferably tuned in accordance with conductive structure located at the respective computing device. In practice, such tuning may include, without limitation: tuning or adjusting the length of radiating section 822; tuning or adjusting the length of input section 820; providing RF matching elements; tuning or adjusting the orientation of antenna element 814; tuning or adjusting the shape, size, or topology of antenna element 814; tuning or adjusting the mounting distance of radiating section 822 relative to the antenna end of conductive housing 802; selecting the composition or material for antenna element 814; selecting the composition or material for dielectric mounting element 812; tuning or adjusting the size, shape, or topology of dielectric mounting element 812; selecting the configuration of RF connector 806; and/or selecting the manner in which antenna arrangement 804 is manufactured. In a practical embodiment of the invention, antenna arrangement 804 is tuned or otherwise configured to consider the intended deployment of wireless data communication card 800. For example, wireless data communication card 800 (including the RF communication module and antenna arrangement 804) may be suitably configured for operation in compliance with one or more wireless data communication protocols, such as IEEE Standard 802.11(b) or any variant of IEEE Standard 802.11. Furthermore, wireless data communication card 800 may be suitably configured in compliance with PCMCIA packaging and/or operating standards. Consequently, antenna arrangement 804 may also be suitably tuned to account for these and other practical requirements.

In practice, the conductive structure of the computing device may be modeled, simulated, or otherwise measured to determine its impact on the RF characteristics of wireless data communication card 800. It should be appreciated that a number of conventional RF modeling, testing, or simulation applications may be utilized to assist in the tuning of antenna arrangement 804. Assuming that the conductive structure of the computing device remains fixed, antenna arrangement 804 can be suitably tuned after the conductive structure has been appropriately characterized. In connection with tuning, any number of RF tests or measurements of antenna arrangement 804 may be performed, including, without limitation: antenna efficiency; radiation pattern; and/or return loss. Such practical measurements can be analyzed to iteratively tune antenna arrangement 804 if necessary until the desired RF performance characteristics are achieved.

Figure 11:
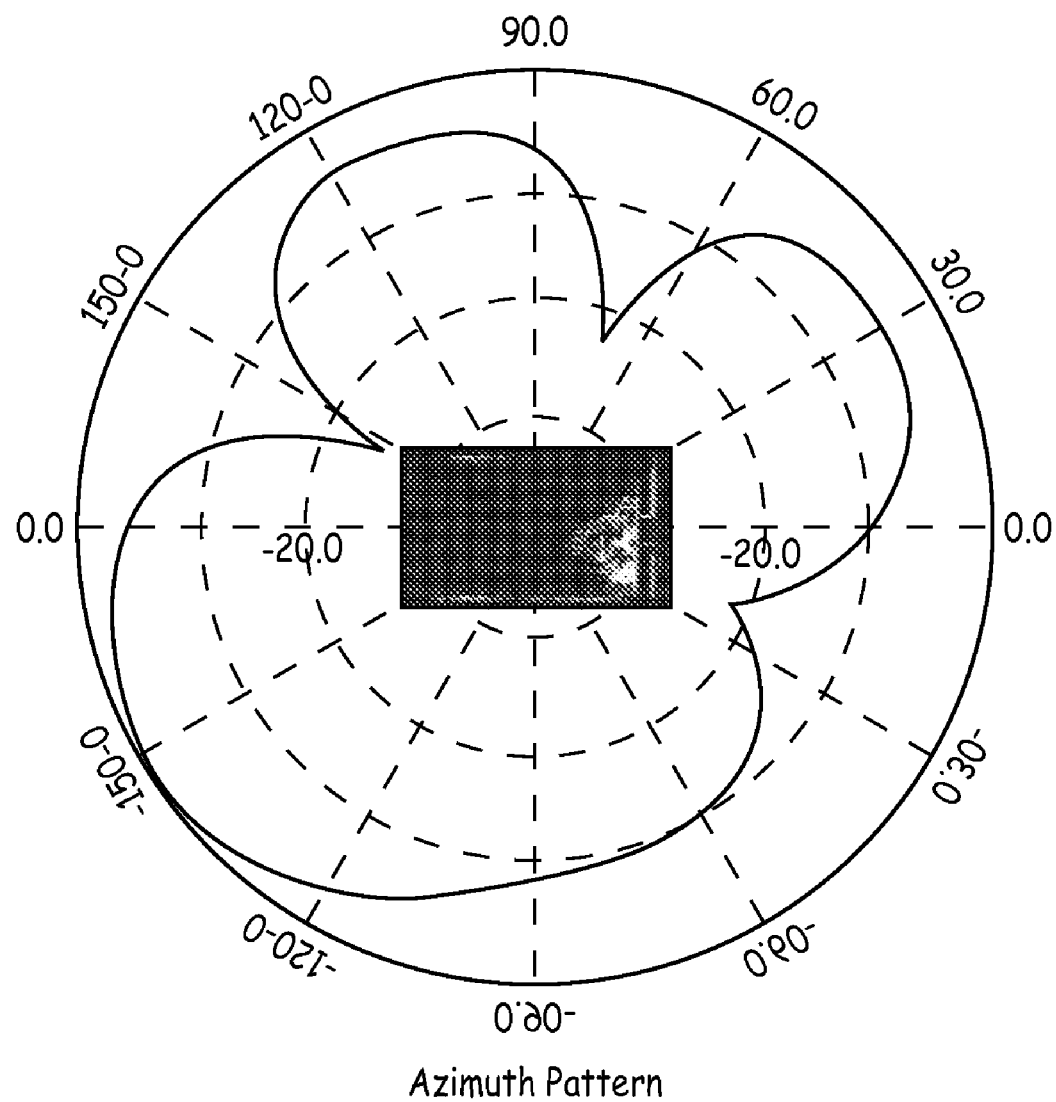
FIG. 11 is a radiation pattern for a wireless data communication card having a dual antenna configuration.
Figure 12:
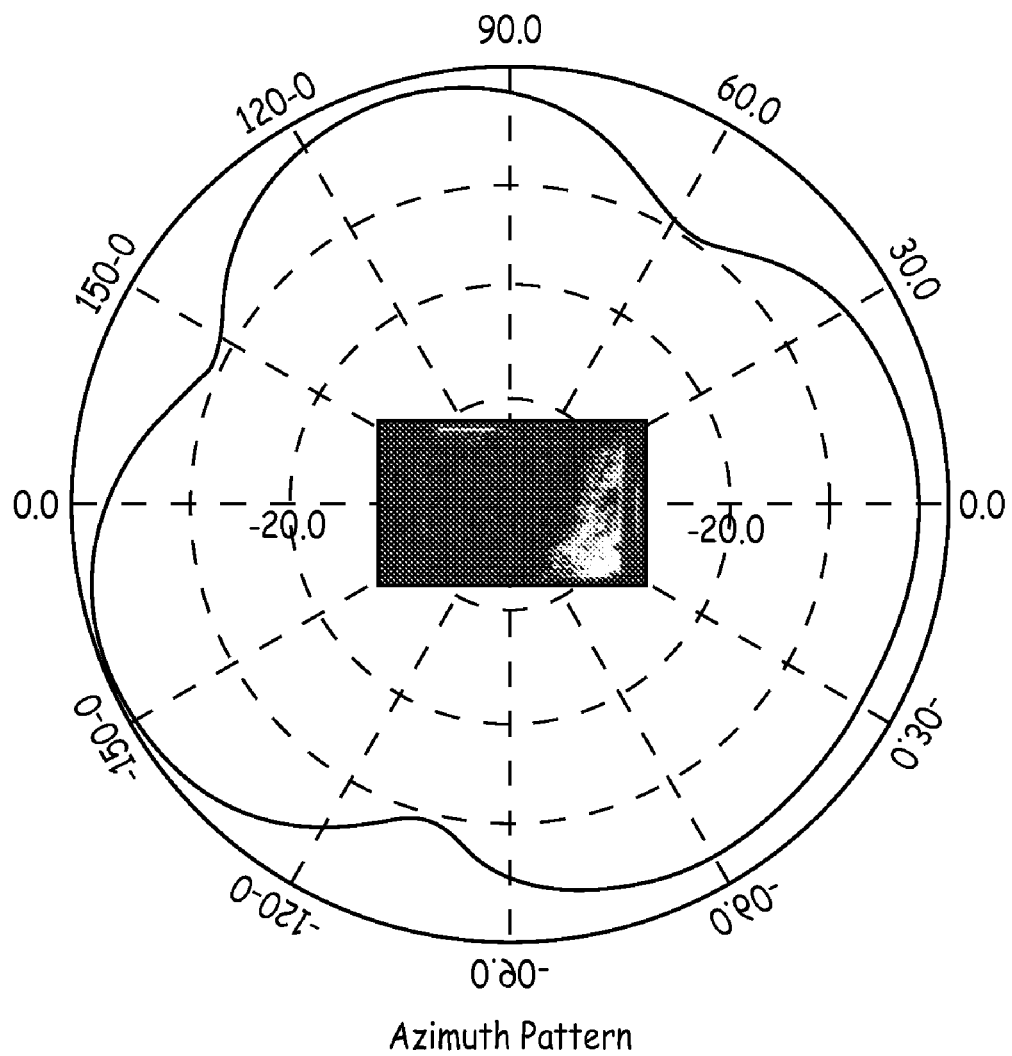
FIG. 12 is a radiation pattern for a wireless data communication card having a single antenna configuration.

FIG. 11 is an example radiation pattern for a wireless data communication card having a dual antenna configuration as described above, and FIG. 12 is an example radiation pattern for a wireless data communication card having a single antenna configuration as described above. In practice, the dual antenna configuration may have high directivity (relative to the single antenna configuration), which may result in the radiation of RF energy into the host computing device and a reduction in overall antenna efficiency. Thus, the benefits of spatial diversity derived from the dual antenna configuration may be offset by a degradation in RF performance. In comparison, the single antenna configuration produces a relatively uniform radiation pattern that extends away from the host-computing device in all directions (see FIG. 12). Such a radiation pattern is desirable in some practical applications, for example, an IMD telemetry component as described above.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. In addition, various changes can be made in the function and arrangement of elements without departing from the scope of the invention as set forth in appended claims and the legal equivalents thereof.

What is claimed is:

1. A wireless data communication card for a computing device, said wireless data communication card comprising:
   a conductive outer housing that provides a radio frequency ("RF") ground structure for said wireless data communication card, said conductive outer housing establishing RF ground coupling to conductive structure of the computing device;
   an RF communication module located within said conductive outer housing; and
   an antenna arrangement coupled to said RF communication module and located external to said conductive outer housing, said antenna arrangement being tuned in accordance with said conductive structure of the computing device.

2. A wireless data communication card according to claim 1, said conductive outer housing having an insertion end and an antenna end opposing said insertion end, and said antenna arrangement being located at said antenna end.

3. A wireless data communication card according to claim 2, said antenna arrangement having a low profile relative to said antenna end.

4. A wireless data communication card according to claim 2, said antenna arrangement comprising:
   a first antenna element having a first input section protruding from said conductive outer housing, and a first radiating section, coupled to said first input section, oriented along said antenna end in a first direction; and
   a second antenna element having a second input section protruding from said conductive outer housing, and a second radiating section, coupled to said second input section, oriented along said antenna end in a second direction.

5. A wireless data communication card according to claim 4, the length of said first radiating section and the length of said second radiating section being tuned in accordance with said conductive structure of the computing device.

6. A wireless data communication card according to claim 2, said antenna arrangement comprising a single antenna element having an input section protruding from said conductive outer housing, and a radiating section coupled to said input section.

7. A wireless data communication card according to claim 6, the length of said radiating section being tuned in accordance with said conductive structure of the computing device.

8. A wireless data communication card according to claim 1, said RF communication module and said antenna arrangement being configured for operation in compliance with IEEE Standard 802.11(b).

9. An antenna arrangement for a wireless data communication card configured for use with a computing device, said antenna arrangement comprising:
   a radio frequency ("RF") ground structure for establishing RF ground coupling to conductive structure of the computing device; and
   at least one antenna element tuned in accordance with said conductive structure of the computing device.

10. An antenna arrangement according to claim 9, further comprising:
    a first antenna element having a first input section and a first radiating section coupled to said first input section, said first radiating section being oriented in a first direction; and
    a second antenna element having a second input section and a second radiating section coupled to said second input section, said second radiating section being oriented in a second direction opposing said first direction.

11. An antenna arrangement according to claim 10, the length of said first radiating section and the length of said second radiating section being tuned in accordance with said conductive structure of the computing device.

12. An antenna arrangement according to claim 9, said at least one antenna element comprising a solid monopole wire antenna.

13. An antenna arrangement according to claim 9, said at least one antenna element comprising a flexible conductor formed on a flexible adhesive tape.

14. An antenna arrangement according to claim 9, said RF ground structure being configured to capacitively couple to a ground plane of the computing device.

15. An antenna arrangement according to claim 9, said at least one antenna element consisting of a single antenna element having an input section and a radiating section coupled to said input section.

16. A computing device comprising:
    a housing;

a card slot formed in said housing;
conductive structure contained in said housing; and
a wireless data communication card configured for engagement with said card slot, said wireless data communication card comprising:
a conductive outer housing that provides a radio frequency ("RF") ground structure, said conductive outer housing establishing RF ground coupling to said conductive structure;
an RF communication module located within said conductive outer housing; and
an antenna arrangement coupled to said RF communication module and located external to said conductive outer housing, said antenna arrangement being tuned to account for said conductive structure.

17. A computing device according to claim 16, said conductive outer housing having an insertion end and an antenna end opposing said insertion end, and said antenna arrangement being located at said antenna end.

18. A computing device according to claim 17, said antenna arrangement having a low profile such that said antenna arrangement is enclosed within said housing when said wireless data communication card is engaged in said card slot.

19. A computing device according to claim 16, said antenna arrangement comprising a radiating section having a length that is tuned to account for said conductive structure.

20. A computing device according to claim 16, said wireless data communication card being configured for operation in compliance with IEEE Standard 802.11(b).

* * * * *